UNITED STATES PATENT OFFICE.

GUSTAV BLIEBERGER, OF NEW YORK, N. Y., ASSIGNOR TO ANTHONY-HAMMOND CHEMICAL WORKS, INC., OF NEW YORK, N. Y., A CORPORATION OF NEW YORK.

PROCESS OF MAKING BETA-NAPHTHOL BENZOATE.

1,254,970.  Specification of Letters Patent.  Patented Jan. 29, 1918.

No Drawing.  Application filed December 5, 1916. Serial No. 135,243.

*To all whom it may concern:*

Be it known that I, GUSTAV BLIEBERGER, formerly a subject of the Emperor of Austria-Hungary, and having declared my intention of becoming a citizen of the United States by taking out my first papers, and now residing at New York city, in the county of New York and State of New York, have invented certain new and useful Improvements in Processes of Making Beta-Naphthol Benzoate, of which the following is a specification.

My invention relates to a process of making beta naphthol benzoate, and the invention consists of the steps and the succession of steps constituting the process substantially as hereinafter described and claimed.

In the carrying out of my process, and in order that those skilled in the art may be advised of at least one and a preferred method by which to successfully practice the same, I take say, 100 parts of benzoic acid and 70 parts of phosphorus trichlorid, or pentachlorid, and thoroughly mix these ingredients. While the mixing may be done by various methods and, possibly, by the use of different types of apparatus, I prefer the mixing to be effected in a steam-jacketed enamel kettle which is sufficiently heated to produce a temperature which is below the boiling point of phosphorus trichlorid or pentachlorid. The heating is to be continued until the two substances have combined and then the mixture is allowed to cool, by any well known method, and it is then purified, by following any method well known for such a purpose, but preferably by transferring the mixture to a vacuum still, having a receiver and condenser. Under this treatment, the benzoyl chlorid which is formed by heating the two substances above named together is purified.

In the further working of my process to produce beta naphthol benzoate, beta naphthol and benzoyl chlorid are combined in a novel manner. I take say, 110 parts of beta naphthol and slowly heat the same to a temperature below the boiling point of benzoyl chlorid. This may be done by various means and by the use of any apparatus suitable for the purpose, but I prefer to effect the heating in a kettle having a reflex condenser as by using such a condenser, if the heat rises above 198° C. which is the boiling point of benzoyl chlorid, this substance is vaporized and passes through the reflex condenser, which is preferably water cooled, and the vapor is condensed and drops back into the kettle. This clearly shows that although I employ a higher temperature than heretofore used none of the benzoyl chlorid is lost by evaporation and a larger amount of final product is obtained. Any free gases, such as hydro-chloric acid gas will pass through the condenser and may thus be separated from the beta naphthol benzoate.

In the 110 parts of beta naphthol molten as before stated, say 170 parts of benzoyl chlorid are slowly and by means of a regulator dropped in and constantly stirred, and there results from this gradually carried out operation the beta naphthol benzoate, in an easy and convenient manner and without loss of benzoyl chlorid by evaporation as but little of the benzoyl chlorid is present at the time and in case a little distils off it is condensed and returned. Thus the more staple beta naphthol always is present in a very large excess while the liquid benzoyl chlorid gradually drops down upon the beta naphthol in a regulated manner. The stirring of course aids in a quick combination of the two components. The combined product is allowed to cool and then taken out of the kettle, placed in water and washed. After washing it is allowed to settle and then the water is decanted or drawn off.

The beta naphthol benzoate which has been produced by the process herein described, is now dissolved in warm alcohol or by means of some suitable solvent, and is filtered, through pure animal charcoal or other filtering agent, and is allowed to cool, this cooling step causing crystallization. It is then separated by filtering through cloth or other suitable filtering media, and is finally dried and thus becomes a commercial product.

While the proportions and steps heretofore mentioned have been found very suitable for the carrying out of my process, I wish it understood that the proportions and the exact recital of steps may be open to some modification and hence I do not wish to be understood as limiting myself to the exact proportions, but to include such proportions and operations as come within the scope of this invention.

Having thus described my invention what I claim as new and desire to secure by Letters Patent is:—

1. The improvement in the art of producing beta naphthol benzoate, consisting in slowly heating the beta naphthol, allowing benzoyl chlorid to drop onto the heated beta naphthol, constantly stirring the mass, condensing and returning any evaporated benzoyl chlorid, and allowing any occurring hydro-chloric acid gas to escape.

2. The improvement in the art of producing beta naphthol benzoate, consisting in slowly heating the beta naphthol, constantly stirring the heated beta naphthol, allowing constantly renewed very small quantities of benzoyl chlorid in form of drops to act on and combine with part of the large excess of the heated beta naphthol, condensing and returning any evaporated benzoyl chlorid, and allowing any occurring hydro-chloric acid gas to escape.

3. The improvement in the art of producing beta naphthol benzoate, consisting in keeping about 110 parts of beta naphthol in a heated condition, allowing about 170 parts of benzoyl chlorid to gradually drop onto the heated beta naphthol while constantly stirring the mass, condensing and returning any evaporated benzoyl chlorid, and allowing any occurring hydro-chloric acid gas to escape.

4. The improvement in the art of producing beta naphthol benzoate, consisting in keeping about 110 parts of beta naphthol in a heated condition while constantly stirring, allowing constantly renewed very small quantities of benzoyl chlorid in form of drops to act on and combine with part of the large excess of the heated beta naphthol until about 170 parts of benzoyl chlorid have been applied, condensing and returning any evaporated benzoyl chlorid, and allowing any occurring hydro-chloric acid gas to escape.

5. The improvement in the art of producing beta naphthol benzoate, consisting in slowly heating the beta naphthol, allowing benzoyl chlorid to drop onto the heated beta naphthol while constantly stirring the mass, condensing and returning any evaporated benzoyl chlorid, allowing any occurring hydro-chloric acid gas to escape, and purifying the combined mass to obtain the final product.

6. The improvement in the art of producing beta naphthol benzoate, consisting in keeping about 110 parts of beta naphthol in a heated condition, allowing about 170 parts of benzoyl chlorid to gradually drop onto the heated beta naphthol while constantly stirring the mass, condensing and returning any evaporated benzoyl chlorid, allowing any occurring hydro-chloric acid gas to escape, and purifying the combined mass to obtain the final product.

In testimony whereof I affix my signature.

GUSTAV BLIEBERGER.